(12) United States Patent
Dübal et al.

(10) Patent No.: US 7,019,811 B1
(45) Date of Patent: Mar. 28, 2006

(54) SMECTIC LIQUID CRYSTAL HIGH-CONTRAST CONTROL OR DISPLAY DEVICE

(75) Inventors: Hans-Rolf Dübal, Eltville (DE); Barbara Hornung, Hasselroth (DE); Toshiaki Nonaka, Kakegawa (JP)

(73) Assignee: Clariant International, Ltd., Muttenz (CH)

( * ) Notice: Subject to any disclaimer, the term of this patent is extended or adjusted under 35 U.S.C. 154(b) by 0 days.

(21) Appl. No.: 10/048,104

(22) PCT Filed: Jul. 24, 2000

(86) PCT No.: PCT/EP00/07075

§ 371 (c)(1),
(2), (4) Date: Jun. 17, 2002

(87) PCT Pub. No.: WO01/07535

PCT Pub. Date: Feb. 1, 2001

(30) Foreign Application Priority Data

Jul. 28, 1999 (DE) ................................ 199 34 798

(51) Int. Cl.
*C09K 19/02* (2006.01)
(52) U.S. Cl. ...................... 349/171; 349/172; 349/179; 349/180; 349/181; 349/182; 349/184
(58) Field of Classification Search ........ 349/171–172, 349/179–182, 184
See application file for complete search history.

(56) References Cited

U.S. PATENT DOCUMENTS

| 4,941,736 | A | * | 7/1990 | Taniguchi et al. ........... 349/173 |
| 5,547,605 | A | * | 8/1996 | Fuss et al. ................ 252/299.6 |
| 5,629,788 | A |   | 5/1997 | Mori et al. |
| 6,351,301 | B1 | * | 2/2002 | Takatori ...................... 349/172 |
| 6,577,289 | B1 | * | 6/2003 | Asao et al. ................... 345/87 |

FOREIGN PATENT DOCUMENTS

| EP | 0 532 210 A2 | 3/1993 |
| EP | 0 539 991 A1 | 5/1993 |
| EP | 0 548 548 A1 | 6/1993 |
| WO | 97/12355 | 4/1997 |

OTHER PUBLICATIONS

Patent Abstracts of Japan, Publication No. 05102227, Publication Date Apr. 23, 1993, vol. 017, No. 453.
Patent Abstracts of Japan, Publication No. 05216034, Publication Date Aug. 27, 1993, vol. 017, No. 654.

* cited by examiner

*Primary Examiner*—Toan Ton
*Assistant Examiner*—George Y. Wang
(74) *Attorney, Agent, or Firm*—Frommer Lawrence & Haug LLP

(57) ABSTRACT

The liquid-crystal switching or display device comprises a chiral smectic liquid-crystal mixture, where the ratio $\Delta/\Theta$ of the angle between the rubbing direction and the smectic layer normal to the tilt angle in the liquid-crystal mixture is at least 0.41. Preferably, the liquid-crystal mixture has the phase sequence I-N-C and the tilt angle $\Theta$ at 25° C. is between 19° and 39°.

7 Claims, 3 Drawing Sheets

SMECTIC LIQUID CRYSTAL HIGH-CONTRAST CONTROL OR DISPLAY DEVICE

Displays or electro-optical display devices based on smectic liquid-crystal mixtures as electro-optically active layer are gaining in importance owing to their high response speeds.

The use of smectic liquid crystals in electro-optical or fully optical components requires either compounds which form tilted or orthogonal smectic phases and are themselves optically active, or the induction of ferroelectric or electroclinically active smectic phases by doping, with optically active compounds, of compounds which, although forming such smectic phases, are not themselves optically active. The desired phase should also be stable over the broadest possible temperature range to ensure that the display has a broad operating range. In particular, the achievable contrast should be as high as possible over the entire operating range. Liquid-crystal displays may be operated in principle as active- or passive-matrix display.

In what is known as active-matrix technology (AMLCD), a nonstructured substrate is usually combined with an active-matrix substrate. An electrically non-linear element, for example a thin-film transistor, is integrated into each pixel of the active-matrix substrate. The non-linear elements can also be diodes, metal-insulator-metal and similar elements, which are advantageously produced by thin-film processes and are described in the relevant literature (see, for example, T. Tsukuda, TFT/LCD: Liquid Crystal Displays Addressed by Thin-Film Transistors, Gordon and Breach 1996, ISBN 2-919875-01-9, and the references cited therein).

Active-matrix LCDs are usually operated with nematic liquid crystals in TN (twisted nematics), ECB (electrically controlled birefringence), VA (vertically aligned), IPS (in-plane switching) or OCB (optically compensated bend) mode. In each case, the active matrix generates an electric field of individual strength on each pixel, producing a change in alignment and thus a change in birefringence, which is in turn optically visible in polarized light. A severe disadvantage of these processes is the poor video capability, i.e. the excessively slow response times of nematic liquid crystals. In particular, nematic LCDs are not capable of displaying sharp moving pictures, as described, for example, in Sueoka et al (K. Sueoka, H. Nakamura and Y. Taira, SID 1997, p. 203–206, ISSN 1083-1312/97/1701-0203).

For this and other reasons, liquid-crystal displays based on the combination of ferroelectric liquid-crystal materials and active-matrix elements have been proposed, for example in WO 97/12355 or in Ferroelectrics 1996, 179, 141–152, or by W. J. A. M. Hartmann (IEEE Trans. Electron. Devices 1989, 36, 9; Pt. 1, pp. 1895–9, and Dissertation, Eindhoven, The Netherlands, 1990), which, however, were never brought to practical maturity owing to a limited temperature range and difficult reproducibility of the smectic texture.

While Hartmann utilizes the charge-controlled bistability to display a virtually continuous gray scale, Nito et al. have suggested a monostable FLC geometry (Journal of the SID, 1/2, 1993, pp. 163–169) in which the FLC material is aligned by means of relatively high voltages such that only a single stable position results from which a number of intermediate states are then generated by application of an electric field via a thin-film transistor. These intermediate states correspond to a number of different brightness values (gray shades) when the cell geometry is matched between crossed polarizers.

The disadvantage of the paper by Nito et al. is the occurrence of a streaky texture which limits the contrast and brightness of this cell (see FIG. 8 of the abovementioned citation). Furthermore, this method produces switching only in an angle range of up to a maximum of once the tilt angle, which is about 22° in the case of the material used by Nito et al. (cf. p. 165, FIG. 6) and thus produces a maximum transmission of only 50% of the transmission of two parallel polarizers.

Terada et al. have suggested a monostable FLC configuration (Terada, M., Togano, T., Asao, Y., Moriyama, T., Nakamura, S., Iba, J., presented at the Applied Physics Conference, Mar. 28, 1999, Tokyo, Japan; Abstract No. 28p-V-8). With respect to the phases, Terada et al define the sequence I-N-C as "sufficient". However, these prototypes are not yet suitable for practical use over a relatively large temperature range. One reason for this is that, in practice, I-N-C is a necessary, but not a sufficient condition, and suitability for practical use places a number of additional conditions on the liquid crystal.

It is an object of the present invention to provide a suitable chiral smectic liquid-crystal mixture and a switching and display device comprising such a suitable chiral smectic liquid-crystal mixture, where the liquid-crystal mixture makes it possible, owing to its excellent alignment properties and specified favorable alignment angles, to achieve a very high contrast over a broad temperature range.

A precondition for a very high contrast over a broad temperature range is an extremely small dark transmission of the LCD cell. This is in turn achieved, on the one hand, only when the mixture has excellent alignment properties, because any defect or local deviation of the director from the dark position reduces the contrast significantly, and, on the other hand, when the alignment varies only slightly with temperature. This applies in particular when considering a broad operating temperature range, e.g. from −1° C. to +60° C., preferably from 0° C. to +55° C., in particular from 10° C. to 50° C.

This object is achieved according to the invention by a liquid-crystal switching or display device comprising a chiral smectic liquid-crystal mixture, characterized in that the ratio $\Delta/\Theta$ of the angle between the rubbing direction and the smectic layer normal to the tilt angle in the liquid-crystal mixture is at least 0.41.

Preferably, the object is achieved by a chiral smectic switching or display device which utilizes a chiral smectic liquid-crystal mixture having the phase sequence I-N-C, the symbols having the following meaning:

I=isotropic phase

N=nematic or cholesteric phase

C=smectic C phase (including all sub-types of the C phase) or another tilted phase, chiral or containing chiral dopants (the symbol * which is customary in the literature is omitted for the sake of simplicity of representation), and the alignment being such that the angle ratio w, defined as $w=\Delta/\Theta$ is at least 0.41, where $\Delta$ is the angle between the rubbing direction (FIG. 1, axis 1) and the smectic layer normal (FIG. 1, axis 2), where the term rubbing direction includes a preferential direction obtained by other processes than a rubbing treatment, e.g. photo-alignment or the like, and $\Theta$ is the tilt angle, preferably determined by the response behavior by means of electric voltages or X-ray analysis (FIG. 1, axes 2 and 4' or 2 and 4, respectively).

Preference is given to w values of at least 0.45, particularly preferably >0.53, in particular between 0.55 and 0.99, most particularly between 0.60 and 0.85.

Particularly preferaby, w is at least 0.41 while simultaneously limiting the tilt angle range to 19° to 39°, preferably 20° to 36°, particularly preferably 22° to 34°, most preferably 23° to 33°, in particular 24° to 32° (at 25° C.).

Moreover, the object is achieved according to the invention by a chiral smectic liquid-crystal switching or display device comprising a chiral smectic liquid-crystal mixture having the phase sequence I-N-C in monostable alignment, the alignment being such that the angle ρ between the rubbing direction and the monostable position (maximum dark position, axes 1 and 3 in FIG. 1) is at least 1°, preferably at least 1.3°, particularly preferably at least 1.6°, in particular at least 1.9°.

Preference is given to combinations of the features of the first and second, first and third, second and third, or first, second and third above-described embodiments of the liquid-crystal switching and display device of the invention.

Particularly preferaby, w is at least 0.41 while simultaneously having an angle ρ of more than 10.

Particularly preferaby, w is at least 0.41 while simultaneously limiting the tilt angle range to 19° to 39° (at 25° C.) and, as additional condition, having an angle ρ of more than 10.

Particularly preferably, w is at least 0.41 while simultaneously limiting the tilt angle range to 19° to 39° (at 25° C.), having an angle ρ of more than 1° and, as additional condition, having a spontaneous polarization of <150 $nC/cm^2$.

Preference is given to a mixture having the phase sequence I-N-C whose spontaneous polarization in the operating temperature range is <150 $nC/cm^2$, particularly preferably <70 $nC/cm^2$, very particularly preferably <35 $nC/cm^2$, in particular <15 $nC/cm^2$, most particularly in the range from 4.1 to 9.9 $nC/cm^2$.

Such displays exhibit a virtually or completely defect-free alignment and a dark position which is very dark, and thus have a high contrast over a broad temperature range. Examples of such displays are active-matrix displays or passive-matrix displays.

The object is likewise achieved according to the invention by a chiral smectic switching or display device, in particular by an active-matrix display containing a liquid-crystal mixture and by the liquid-crystal mixture itself which have the phase (transition) sequence

I-N-C having a moderately, i.e. not too weakly and not too strongly, suppressed smectic A phase which manifests itself by one or both of the following features:

increasing the concentration of at least one component of the mixture which induces a smectic A phase by 25% by weight, based on the total mixture, leads to the occurrence of a significant smA phase range in the mixture, whereas increasing the concentration by only 5% by weight does not lead to the occurrence of an smA phase, or the addition of ten (10) % by weight, based on the total mixture, of a smectic A inducer, preferably component A, CAS registration no. 156682-16-5, designation: 5-[6-(octyloxy)-3-pyridinyl]-2-(octyloxy) pyrimidine

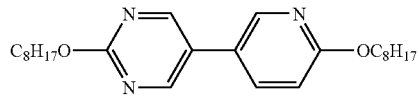

leads to the occurrence of an smA phase range of less than 5.5° C. (phase width), but of at least 0.1° C. on addition of 25% by weight, bases on the total mixture, of component A.

The invention furthermore relates to a process for finding suitable liquid-crystal mixtures which comprises the above-mentioned process steps.

Furthermore, the LCD cell is advantageously asymmetrical, i.e. the top surface and the bottom surface of the cell differ in at least one feature apart from a possible active-matrix construction (thin-film transistor) itself. This is in particular the case:

when using unsymmetrical or unsymmetrically treated alignment layers (for example in the case of antiparallel rubbing)

when one of the two alignment layers is omitted when the step of rubbing one of the two alignment layers is omitted or changed when an unsymmetrical layer structure is introduced, for example by additional insulation layers having different properties on their top and bottom surfaces with all measures which finally result in exposure of the liquid-crystal domain to an unsymmetrical environment in relation to a symmetry plane parallel to the electrode surfaces.

Expressly included is the advantageous use of the novel materials and mixtures for active-matrix displays, antiferroelectric displays and smectic displays, the term "display" being intended to mean any type of optical display or switching device regardless of its size, structure, light guidance, addressing and use.

In particular, the term "active-matrix display" as used herein includes an LCD in which one of the two substrates is replaced by the rear side of an IC chip (IC=integrated circuit) as described, for example, in D. M. Walba, Science 270, 250–251 (1995) or http://www.displaytech.com, i.e. the LCOS (LC On Silicon) technology.

In particular, the term "active-matrix display" as used herein includes an LCD in which one of the two substrates is replaced by the rear side of a plasma cell (plasma-addressed LCD).

In general, preference is given to displays having an electrode separation of 0.7 to 3.0 μm, in particular active-matrix displays having an electrode separation of 0.8 to 2.0 μm, which contain a chiral smectic mixture exhibiting a weakly suppressed smA phase.

Particular preference is given to a display utilizing pulsed or rapidly changing backlight ("sequential backlight" technology).

The object is likewise achieved by the use of a chiral smectic liquid-crystal mixture having the phase sequence I-N-C as electro-optically active layer in monostable switching and display devices or displays, characterized in that the chiral smectic liquid-crystal mixture has the following combination of properties:

TC greater than 50° C. and $T_{NI}$ less than 105° C. and

19°<tilt angle (25° C.)<39° and spontaneous polarization less than 150 $nC/cm^2$ and pitch of the cholesteric helix greater than 2 μm and the difference of the tilt angles measured at 15° C. and 5° C. below Tc, the upper limit of the range of existence of the optically active smectic phase, is less than 9.5°. It is advantageous that the (total) content of N- and/or S-heterocyclic compounds in the mixture is at least 20% by weight. Particular preference is given to thiophene derivatives.

The invention is explained in greater detail by the examples below.

EXAMPLE 1

To illustrate the moderately suppressed smA phase, a mixture is prepared from a mixture M1 and component B:

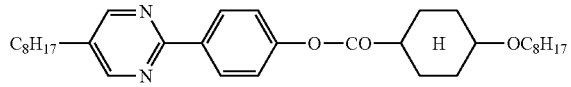

Figure 2:
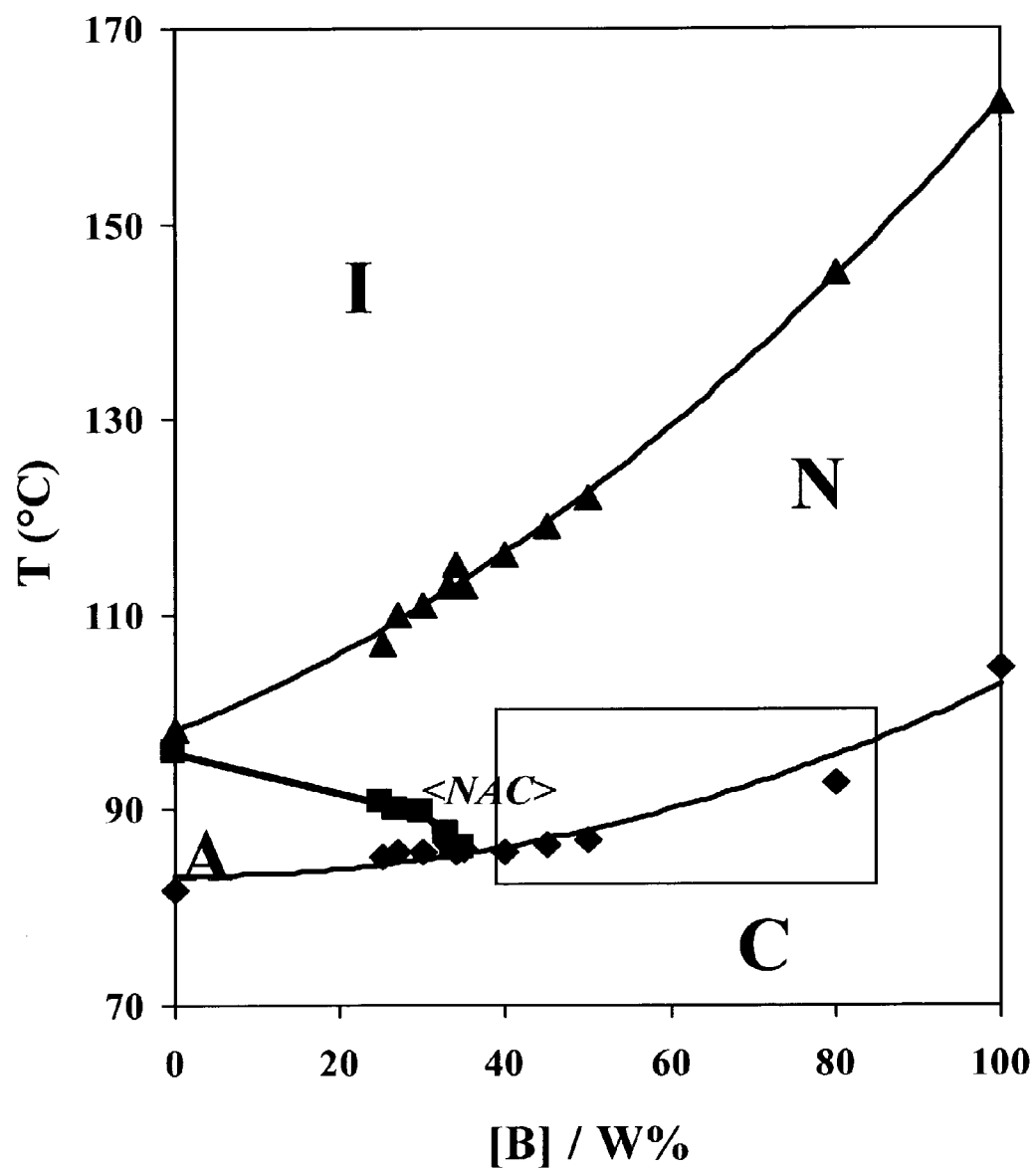
FIG. 2 is the phase diagram for Example 1

The concentration of component B is continuously varied. In this way, a two-dimensional portion of the phase diagram of the mixture is obtained which is depicted in FIG. 2.

TABLE 1

Composition of test mixture M1:

| | % by weight |
|---|---|
| R = $C_8H_{17}$ | 14.43 |
| R = $C_6H_{13}$ | 29.12 |
| R = $C_4H_9$ | 28.47 |
| R = $C_{10}H_{21}$ | 27.98 |
| total % by weight | 100.00 |

The NAC tricritical point occurs at ([M1]=66% by weight, [B]=34% by weight) as depicted in FIG. 2 (in FIG. 2, T denotes the temperature in degrees Celsius, [B] the weight percentage of component B, based on the total mixture). I, N, C have been defined above. A denotes smectic-A phase. The vicinity of the NAC point according to the invention is determined as follows.

Six test mixtures having the following compositions are prepared:

TABLE 2

Test mixtures P–U and phase sequences thereof

| Mixture | [M1] % by weight | [B] | Phase sequence Phases, temperature in ° C. |
|---|---|---|---|
| P | 75 | 25 | C 85.3 A 90.6 N 108 I |
| Q | 66 | 34 | C 85.6 (NAC) 85.6 N 115 I |
| R | 60 | 40 | C 85.6 N 116 I |
| S | 55 | 45 | C 86.5 N 119 I |
| T | 50 | 50 | C 87 N 122 I |
| U | 20 | 80 | C 92.7 N 145 I |

The resulting mixtures are admixed with 10% by weight of component A (as defined above) as smA inducer. The following phase ranges are obtained:

TABLE 3

Test mixtures PA–UA and phase sequences thereof following addition of component A (see above, 10% by weight)

| Mixture | 90 wt % | Phase sequence with 10 wt % of A Phases, temperature in ° C. | Width of smA-phase ° C. |
|---|---|---|---|
| PA | P | C 82.6 A 94.3 N 103 I | 11.7 |
| QA | Q | C 85.5 A 93.0 N 106 I | 7.5 |
| RA | R | C 86.8 A 92.5 N 109 I | 5.7 |
| SA | S | C 88.2 A 90.6 N 112 I | 2.4 |
| TA | T | C 88.5 (NAC) 88.5 N 114 I | 0.0 |
| UA | U | No smA phase | 0.0 |

These data show that the mixtures U,T,S are within the preferred range of the present invention as they are far enough away from the NAC multicritical point and the smA phase is sufficiently strongly suppressed. In particular, smA phase ranges of more than 0.1° C. occur in the mixtures T, S and U upon addition of 25% of component A.

The spontaneous polarization can be adjusted to virtually any value by addition of a suitable chiral substance or substance mixture. For example, the addition of 5% by weight of component C8 (see Example 3 below) to mixture T gives a chiral smectic mixture having the phase sequence I 115 N 84 C. having Ps=−7,8 nC/cm² and a tilt angle of 27° at 25° C.

EXAMPLE 2

LCD Test Cell

An LCD test cell is prepared from two commercially available glass plates which are transparently and conductively coated with indium-tin oxide. The plates are spin-coated (2500 rpm, 10 s) with the alignment layer LQT-120 (from Hitachi Chemicals KK) which was diluted to 8.3% of its original solids content using N-methylpyrrolidone, cured by heating (230° C., 1 h) and then aligned by subjecting them to a rubbing process (rubbing material: rayon type YA-20-R*, clearance 0.2 mm, once, roller speed 700 rpm, substrate speed 10 cm/s, roller diameter 10 cm).

The rubbed glass plates are arranged such that the rubbing direction is antiparallel, adhesively bonded to produce test cells and set 1.3 μm apart by means of a spacer.

The FLC mixture is introduced into the cell and initially aligned in the nematic or cholesteric phase by cooling. On further cooling, a 3 Volt direct voltage is applied and the cell is transferred into the smC phase (chiral smectic C) range at a cooling rate of 2 K/min. During this process, a monstable domain is formed when mixtures according to the invention are used.

The rubbing direction, if it is not known anyway, can be determined experimentally by transfer into the nematic phase by heating and subsequent determination of the dark position between crossed polarizers.

Figure 1:
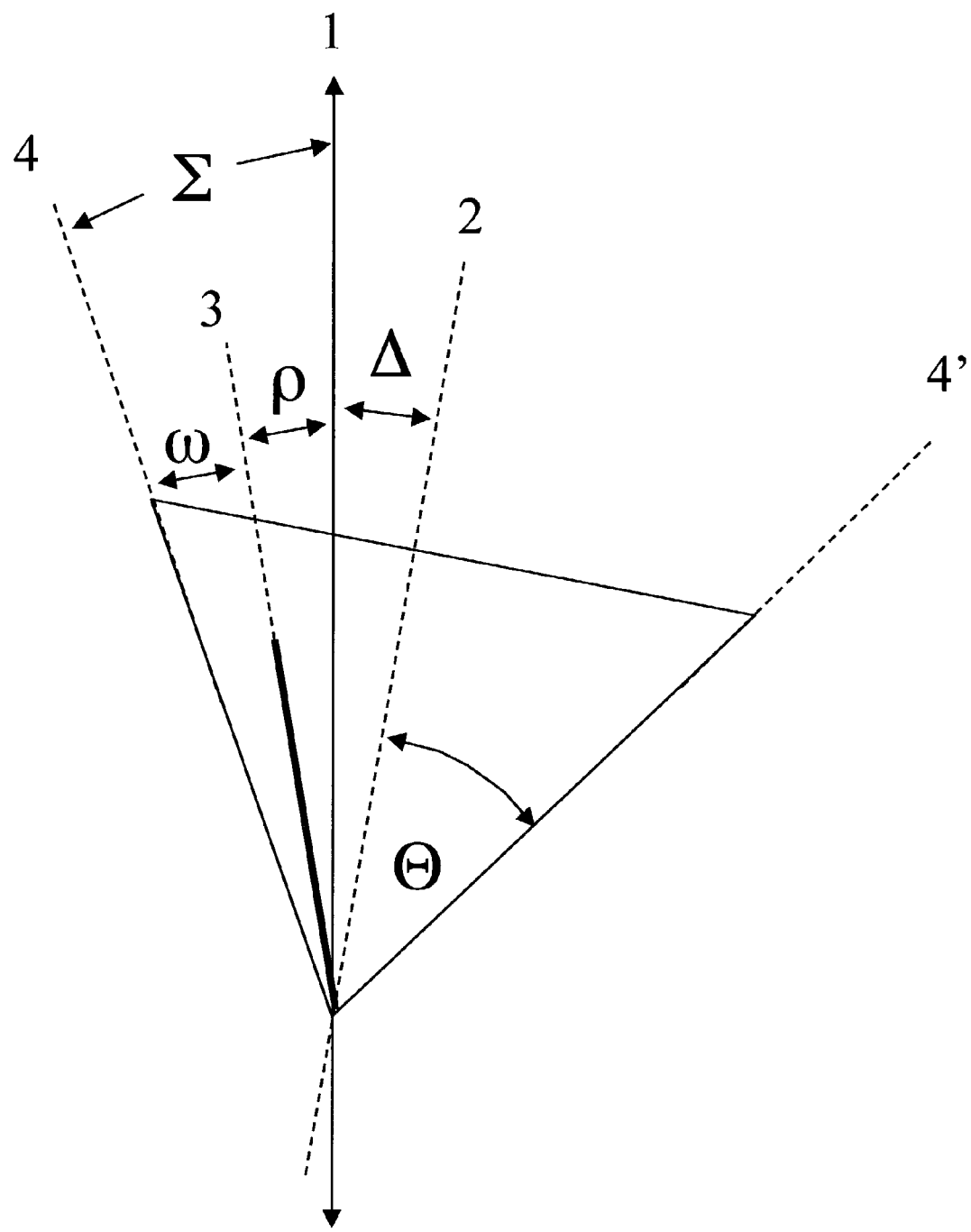
FIG. 1 is a schematic representation of the position of the respective angles used relative to one another

The tilt angle can be determined experimentally by switching the cell at operating temperature. Here, a saturation of the optical transmissions at positive and negative voltage (typically 20 V) is observed which are associated with specific angles of rotation (FIG. 1, axes 4, 4'). The angle difference at saturation gives the value 2Θ (=twice the tilt angle), the angle bisector gives the layer normal (FIG. 1, axis 2). The dark position can be determined easily.

EXAMPLE 3

Test mixtures are prepared from the following components C1–C8 (mixtures V,W,X, see Table 4). The phase transitions and some properties of the cell described in Example 2 and produced using these mixtures are summarized in Table 5.

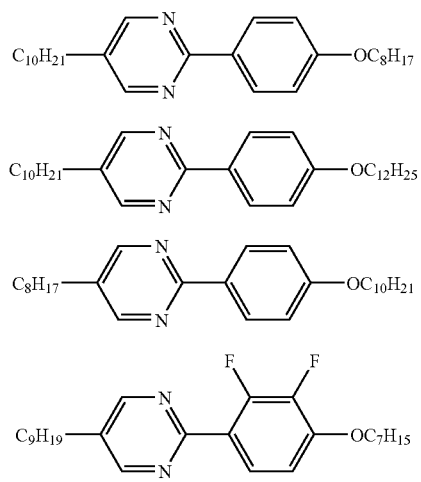

component C1 component C2 component C3 component C4

-continued

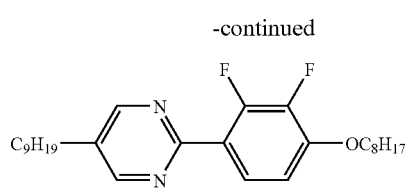

component C5

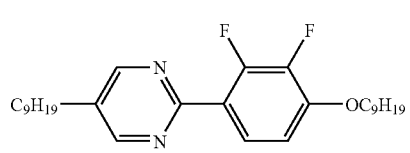

component C6

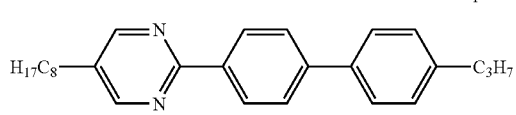

component C7

-continued

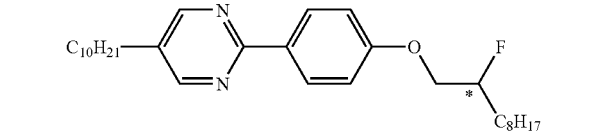

component C8

TABLE 4

Compositions of mixtures V, W, X

| Component | V | W | X |
|---|---|---|---|
| C1 | 14.4% | 7.2% | |
| C2 | 14.4% | 7.2% | |
| C3 | 14.4% | 7.2% | |
| C4 | 14.4% | 21.6% | 28.8% |
| C5 | 14.4% | 21.6% | 28.8% |
| C6 | 14.4% | 21.6% | 28.8% |
| C7 | 10.0% | 10.0% | 10.0% |
| C8 | 3.6% | 3.6% | 3.6% |

TABLE 5

Properties of the chiral smectic mixtures and of the cell produced by the method described in Example 2

| Mixture | Tc | ΔSa | Ps (nC/cm$^2$) 25° C. | $\Theta_{Tc-10}$ | ρ | Σ | Σ/Θ | Δ | w = Δ/Θ |
|---|---|---|---|---|---|---|---|---|---|
| V | 62.8 | 1.5 | 3.7 | 19.9 | — | 19.9 | 1.0 | 0 | 0 |
| W | 56.1 | 0 | 4.8 | 23.1 | 3.6 | 13.7 | 0.59 | 9.4 | 0.41 |
| X | 59.2 | 0 | 5.9 | 23.9 | 4 | 12.2 | 0.51 | 11.7 | 0.49 |

The mixtures W and X have the phase sequence I-N-C and a Δ/Θ ratio of 0.41 (V) and 0.49 (W). In contrast, the use of mixture V having the phase sequence I-N-A-C does not result in advantageous utility for the purposes of the present invention.

EXAMPLE 4

The mixtures W, X are admixed with component A, again such that the concentration of component A in these new mixtures is 10 percent by weight. The following smA phase widths (ΔSa) are obtained:

TABLE 6 smA phase range with 10% by weight of component A in ° C.

| Mixture | Tc | ΔSa |
|---|---|---|
| W | 59 | 4 |
| X | 62 | 2.5 |

These date show that the mixtures W and X have a sufficiently strongly suppressed smA phase which appears on addition of 10% of the smA inducer, and a width of less than 5.5° C. On addition of 25% by weight of component A, 5 mA phase ranges of more than 0, 1° C. are obtained.

EXAMPLE 5

The response properties of the test cells filled with the mixtures W and X (Table 2) are examined. To this end, the optical transmission between crossed polarizers is examined as a function of the applied voltage (bipolar pulse sequences having a frequency of 60 Hz=width of 8.3 ms). The following results were obtained at a temperature of 30° C.:

TABLE 7

Analog gray scale using mixtures W and X

| Voltage (Volt) | Transmission (%) Mixture W | Transmission (%) Mixture X |
|---|---|---|
| 0 | 0 | 0 |
| 0.5 | 2 | 14.8 |
| 1 | 5.4 | 24.2 |
| 1.5 | 12 | 40.2 |
| 2 | 21.4 | 48.4 |
| 2.5 | 38.2 | 53.8 |
| 3 | 48.4 | 57.6 |
| 3.5 | 54 | 60.4 |
| 4 | 59.6 | 63.2 |
| 4.5 | 63.2 | 65 |
| 5 | 65.8 | 66.6 |
| 8 | 71.2 | 69.6 |
| 10 | 72.2 | 70 |

Response times (10 V) of mixture W: 0.22 ms (0–50%) or 0.15 ms (100–50%)
Response times (10 V) of mixture X: 0.20 ms (0–50%) or 0.12 ms (100–50%)

Both mixtures having a moderately, but sufficiently strongly suppressed smA phase can be utilized advantageously because an analog gray scale and submillisecond response at low values of spontaneous polarization are realized.

EXAMPLE 6

Another eight test mixtures are prepared which contain the following components:

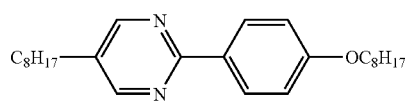
component C9

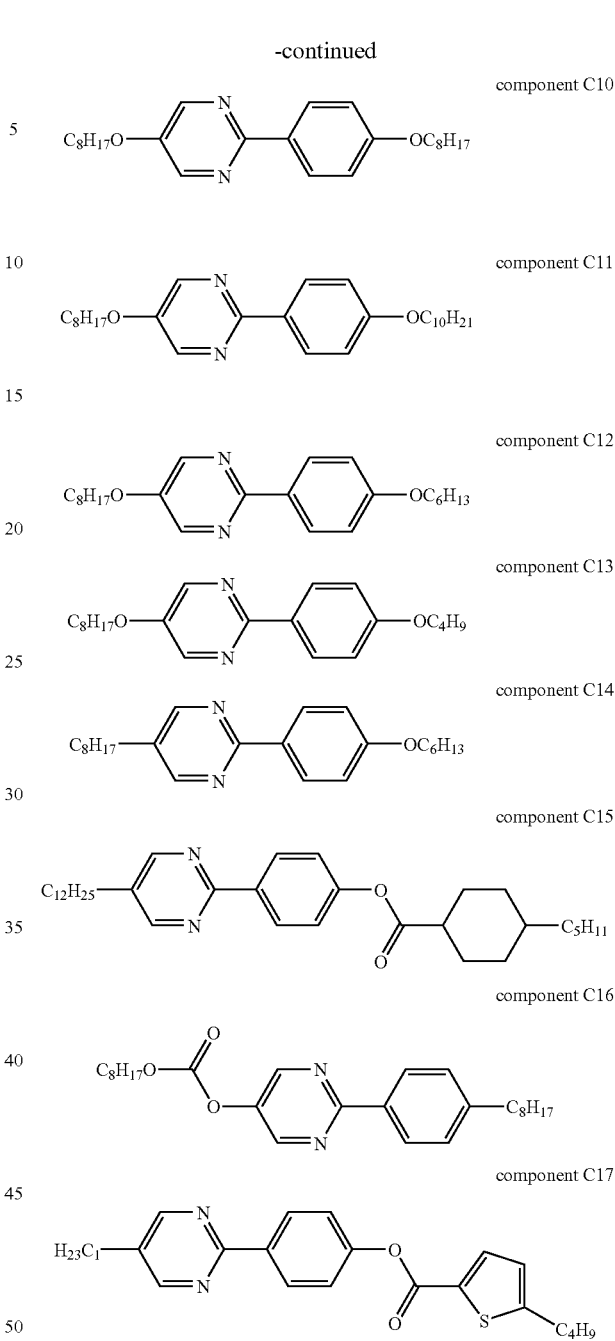

TABLE 8

Compositions of the test mixtures Y1 to Y8.
Amounts are given in percent by weight.

| Component | Y1 | Y2 | Y3 | Y4 | Y5 | Y6 | Y7 | Y8 |
|---|---|---|---|---|---|---|---|---|
| C9 | 8.5% | 9.7% | 10.8% | 12.0% | 13.0% | 9.6% | 8.5% | 7.4% |
| C10 | 2.8% | 3.2% | 3.6% | 4.0% | 4.4% | 3.2% | 2.8% | 2.5% |
| C3 | 6.8% | 7.7% | 8.6% | 9.5% | 10.4% | 7.7% | 6.8% | 5.9% |
| C12 | 5.7% | 6.5% | 7.3% | 8.1% | 8.8% | 6.5% | 5.7% | 5.0% |
| C13 | 5.6% | 6.4% | 7.1% | 7.9% | 8.6% | 6.4% | 5.6% | 4.9% |
| C11 | 5.5% | 6.3% | 7.0% | 7.8% | 8.5% | 6.3% | 5.5% | 4.8% |
| C14 | 8.8% | 10.0% | 11.1% | 12.4% | 13.5% | 10.0% | 8.8% | 7.7% |

TABLE 8-continued

Compositions of the test mixtures Y1 to Y8.
Amounts are given in percent by weight.

| Component | Y1 | Y2 | Y3 | Y4 | Y5 | Y6 | Y7 | Y8 |
|---|---|---|---|---|---|---|---|---|
| C15 | 12.3% | 14.0% | 15.6% | 17.3% | 18.9% | 13.9% | 12.3% | 10.7% |
| C16 | 10.0% | 10.0% | 10.0% | 10.0% | 10.0% | 9.0% | 7.9% | 6.9% |
| C4 | 10.0% | 7.5% | 5.0% | 2.5% | 0.0% | 4.5% | 4.0% | 3.4% |
| C6 | 10.0% | 7.5% | 5.0% | 2.5% | 0.0% | 4.5% | 4.0% | 3.4% |
| C5 | 10.0% | 7.5% | 5.0% | 2.5% | 0.0% | 4.5% | 4.0% | 3.4% |
| C17 | 0.0% | 0.0% | 0.0% | 0.0% | 0.0% | 10.0% | 20.0% | 30.0% |
| C8 | 4.0% | 4.0% | 4.0% | 4.0% | 4.0% | 4.0% | 4.0% | 4.0% |

The mixtures Y1 to Y8 were now examined for their response properties, quality of alignment, temperature dependence of contrast and tilt angle, the angles as represented in FIG. 1, the angle ratio w and the extent of smectic A phase suppression. The experimental results are summarized in Table 9. In the table, the quantities TC (temperature dependence of contrast) and alignment were categorized by visual inspection and optical measurements into three classes (+good, 0 medium, −bad). The quantity TT is determined from measurements of the temperature dependence of the tilt angle at 5° C. (Θ5) and 15° C. (Θ15) below $T_C$, the limit of the range of existence of smC. Then:

$TT=(Θ15−Θ05)/10$.

Figure 3:
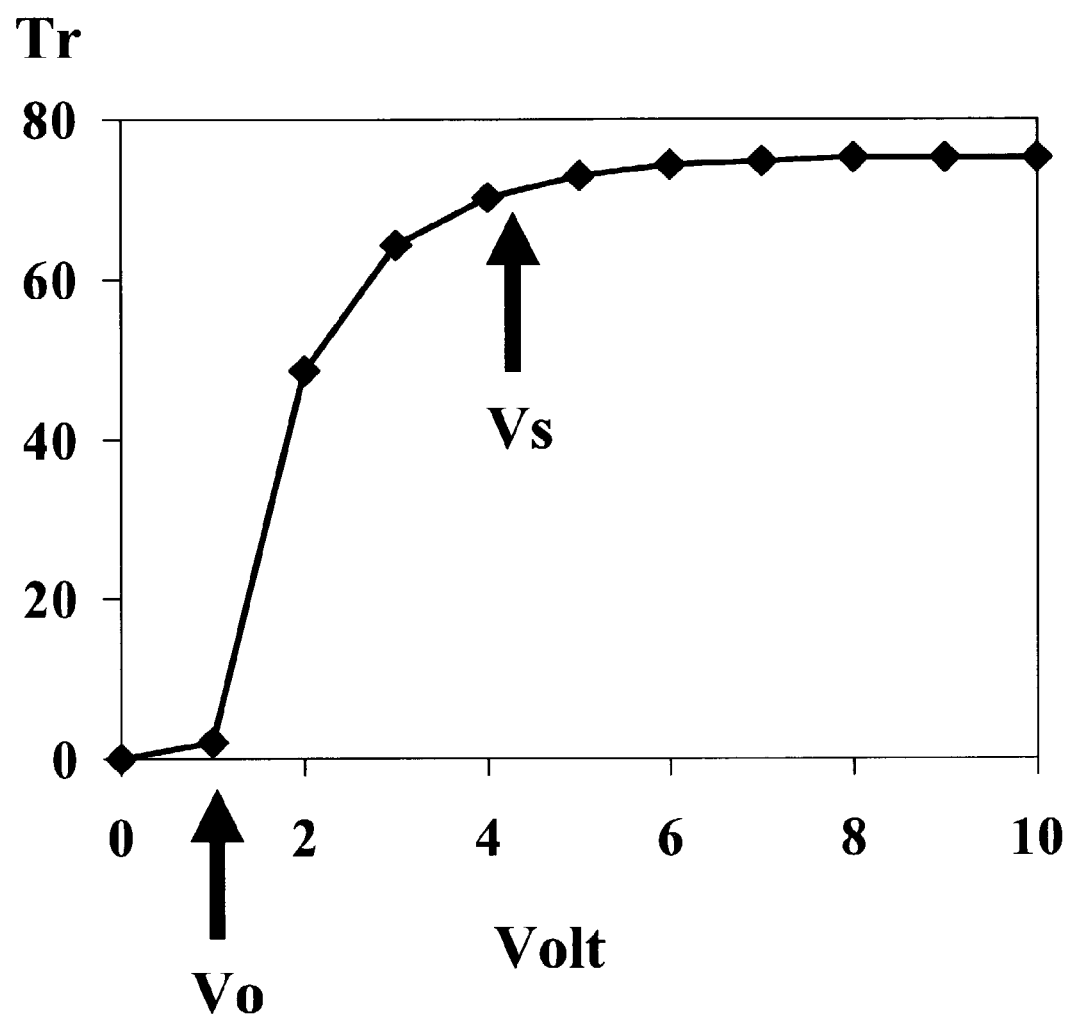
FIG. 3 is the optical transmission of a test cell as a function of the voltage for a mixture from Example 6.

The quantities Vo and Vs are defined in FIG. 3 (threshold voltage and saturation voltage, respectively). FIG. 3 depicts the optical transmission of a test cell as a function of the voltage for the mixture Y7 which is very suitable.

TABLE 9

Measured data for the test mixtures Y1 to Y8

| Measured quantity [Unit] | Y1 | Y2 | Y3 | Y4 | Y5 | Y6 | Y7 | Y8 |
|---|---|---|---|---|---|---|---|---|
| $T_{NI}$ [° C.] | 76 | 79 | 83 | 85 | 86 | 82 | 84 | 84 |
| $T_{NA}$ [° C.] | | | | | 68.8 | | | |
| $T_C$ [° C.] | 62.8 | 64.6 | 66.1 | 67.0 | 67.5 | 63.6 | 60.7 | 59.1 |
| Δ smA [° C.] | 0 | 0 | 0 | 0 | 1.3 | 0 | 0 | 0 |
| Θ [°] 20 V, Tc-30° C. | 29.5 | 28.3 | 27.6 | 26.0 | 23.7 | 28.2 | 29.0 | 29.6 |
| Δ [°] | 20.4 | 18.5 | 14.7 | 10.6 | 0 | 18.7 | 22.4 | 23.6 |
| ρ [°] | 3.4 | 3.5 | 3.3 | 3.5 | | 3.0 | 2.2 | 3.0 |
| Σ [°] | 9.1 | 9.8 | 12.9 | 15.4 | 23.7 | 9.5 | 6.6 | 6 |
| w = Δ/Θ | 0.692 | 0.654 | 0.533 | 0.408 | 0.000 | 0.663 | 0.772 | 0.797 |
| Σ/Θ | 0.308 | 0.346 | 0.467 | 0.592 | 1.000 | 0.337 | 0.228 | 0.203 |
| ρ/Σ | 0.374 | 0.357 | 0.256 | 0.227 | | 0.316 | 0.333 | 0.500 |
| Δ smA* [° C.] + 10% comp. A | 3.2 | 3.3 | 5.4 | 5.7 | 7.9 | 0.8 | 0.0 | 0.0 |
| Vo [Volts] | 0.8 | 0.7 | 0.3 | 1.0 | − | 0.8 | 1.0 | 0.3 |
| Vs [Volts] | 6 | 6 | 7 | 6 | − | 8 | 4.5 | 3.8 |
| Alignment | + | + | 0 | 0 | − | + | + | + |
| TC (cf. text) | 0 | 0 | − | − | − | + | + | + |
| TT (cf. text) | 0.61 | 0.62 | 0.72 | 0.95 | 0.75 | 0.49 | 0.38 | 0.29 |
| Overall evaluation of the cell | + | + | 0 | − | − | + | + | + |

What is claimed is:

1. A liquid-crystal switching or display device comprising a chiral smectic liquid-crystal mixture in monostable alignment, characterized in that the ratio Δ/Θ of the angle between the rubbing direction and the smectic layer normal to the tilt angle in the liquid-crystal mixture is at least 0.41.

2. A liquid-crystal switching or display device as claimed in claim 1, characterized in that the liquid-crystal mixture has the phase sequence I-N-C and the tilt angle Θ at 25° C. is between 19° and 39°.

3. A liquid-crystal switching or display device as claimed in claim 1, characterized in that the mixture has a spontaneous polarization of less than 150 nC/cm$^2$.

4. A liquid-crystal switching or display device as claimed in claim 1, characterized in that the device is an active-matrix or passive-matrix display.

5. A liquid-crystal switching or display device as claimed in claim 1, wherein the chiral smectic liquid-crystal mixture has the following properties:

phase sequence I-N-C and

Tc is greater than 50° C. and wherein $T_{NI}$ is phase transition temperature from the nematic to the isotropic phase less than 105° C. and 19°<tilt angle (25° C.)<39° and spontaneous polarization less than 150 nC/cm$^2$ and pitch of the cholesteric helix greater than 2 μm and the difference of the tilt angles measured at 15° C. and 5° C. below Tc, the upper limit of the range of existence of the optically active smectic phase, is less than 9.5°.

6. The device as claimed in claim 5, characterized in that the chiral smectic liquid crystal mixture comprises of nitrogen- or sulfur-containing heterocyclic compounds in an amount which is at least 20% by weight of total said mixture.

7. The device as claimed in claim 6, characterized in that the chiral smectic liquid crystal mixture comprises at least one sulfur-containing heterocyclic compound which is a thiophene derivative.

* * * * *